Jan. 12, 1971    N. SUGARMAN ET AL    3,554,852
BREATHABLE LAMINATE SUBSTANTIALLY NONPERMEABLE
TO AEROSOLS AND DUSTS
Filed March 9, 1967                    4 Sheets-Sheet 1

FIG. 1

| WOVEN FABRIC |
| HEAT-BONDED NONWOVEN FABRIC |

FIG. 2

| WOVEN FABRIC |
| HEAT-BONDED NONWOVEN FABRIC |
| WOVEN FABRIC |

FIG. 3

| WOVEN FABRIC |
| POLYMER FILM |
| HEAT-BONDED NONWOVEN FABRIC |

Nathan Sugarman
George L. Braude
INVENTORS

BY Kenneth E. Prince
ATTORNEY

Nathan Sugarman
George L. Braude
INVENTORS

Nathan Sugarman
George L. Braude
INVENTORS

BY *Kenneth E. Prince*
ATTORNEY

Jan. 12, 1971   N. SUGARMAN ET AL   3,554,852
BREATHABLE LAMINATE SUBSTANTIALLY NONPERMEABLE
TO AEROSOLS AND DUSTS
Filed March 9, 1967   4 Sheets-Sheet 4

Nathan Sugarman
George L. Braude

INVENTORS

BY *Kenneth E. Prince*

ATTORNEY

United States Patent Office 3,554,852
Patented Jan. 12, 1971

3,554,852
BREATHABLE LAMINATE SUBSTANTIALLY NON-PERMEABLE TO AEROSOLS AND DUSTS
Nathan Sugarman, Needham, Mass., and George L. Braude, Ellicott City, Md., assignors to W. R. Grace & Co., New York, N.Y., a corporation of Connecticut
Filed Mar. 9, 1967, Ser. No. 621,856
Int. Cl. B32b 5/02; D04h 1/54
U.S. Cl. 161—82
22 Claims

ABSTRACT OF THE DISCLOSURE

This invention is directed to a flexible, breathable, wearable, protective laminate substantially non-permeable to aerosols and dusts, said laminate being excellently adapted for the manufacture of protective clothing; said laminate can be made by bonding a web of flexible, breathable, wearable woven fabric to at least one surface of a flexible, breathable, wearable nonwoven fabric comprising a mixture of a first thermoplastic staple fiber having a commercial moisture regain value of less than about 5 percent and having a diameter of about 17 to 50 microns and a second staple fiber having a commercial moisture regain value of about 5 to 15 percent and having a diameter of about 1 to 16 microns.

---

This invention is in the laminating art, and it relates to a self-supporting, flexible, breathable, wearable, protective laminate, said laminate being substantially non-permeable to aerosols and dusts, said laminate being an excellent material for use as a fabric or material for making protective clothing for protecting humans and animals against toxic aerosols and toxic dusts.

In the prior art protective clothing was prepared from fabric which was nonbreathable—i.e., fabric which was substantially nonpermeable to air and moisture, thereby making such clothing unacceptable for prolonged use in hot and humid areas.

In summary, this invention relates to an article of manufacture comprising a self-supporting, flexible, breathable, wearable, protective laminate; said laminate being substantially nonpermeable to aerosols and dusts; said laminate comprising: (a) a substrate having two surfaces, said substrate comprising a flexible, wearable, breathable fabric selected from the group consisting of; (i) nonwoven fabrics made from a mixture of a first staple fiber and a second staple fiber, said fibers being bonded together, said mixture consisting essentially of about 30–90 parts of the first staple fiber, said first staple fiber consisting essentially of at least one substantially linear thermoplastic polymer having a commercial moisture regain value of less than about 5% and having a diameter of about 17–50 microns; about 10–70 parts of the second staple fiber, said second staple fiber consisting essentially of fiber having a commercial moisture regain value of about 5–15% and having a diameter of about 1–16 microns; and (ii) woven fabrics made from yarn; (b) said substrate having an adjunct layer bonded to at least one of the aforesaid surfaces, said layer being; (i) in the case that the substrate is a nonwoven fabric, a flexible, breathable, wearable woven fabric made of yarn; and (ii) in the case that the substrate is a woven fabric, a flexible, breathable, wearable nonwoven fabric made from a mixture of a third staple fiber which can be identical with the aforesaid first staple fiber and a fourth staple fiber which can be identical with the aforesaid second staple fiber, said fibers being bonded together; said mixture consisting essentially of about 30–90 parts of the third staple fiber, said third staple fiber consisting essentially of at least one substantially linear thermoplastic polymer having a commercial moisture regain value of less than about 5% and having a diameter of about 17–50 microns; about 10–70 parts of the fourth staple fiber, said fourth staple fiber consisting essentially of fiber having a commercial moisture regain value of about 5–15% and having a diameter of about 1–16 microns; (c) the weight ratio of nonwoven fabric to woven fabric being about 0.1:1 to 5:1; and (d) the total thickness of the complete laminate being about 1/64 to 1/8 inch.

In the drawings:

FIGS. 7–8 and 13 are diagrammatic illustrations of nonwoven fabrics of this invention. In FIG. 13, 2 is said matrix, and the fibers are shown at 4.

In preferred embodiments of this invention:

(1) A nonwoven fabric is prepared from a first staple fiber having a diameter of about 17–23 microns and a second staple fiber having a diameter of about 5–16 microns;

(2) The fibers of the nonwoven fabric are bonded together with a flexible, breathable matrix of at least one flexible film-forming polymer, the fiber:polymer weight ratio of about 30:1 to 4:1 based on the dry weight of both fiber and polymer;

(3) The fibers of the nonwoven fabric are heat-bonded together;

(4) The nonwoven fabric and the web of woven fabric are heat-bonded together;

(5) The nonwoven fabric and the web of woven fabric are bonded together by a breathable film, or matrix, or coat, of film-forming polymer, the substrate:polymer weight ratio being about 300:1 to 5:1 based on dry weight of both substrate and polymer;

(6) The nonwoven fabric is made from a first staple fiber having a commercial moisture regain value of less than about 1%, thereby to produce a laminate having a very low permeability to aerosols and dusts.

(7) The nonwoven fabric is subjected to compressive shrinkage prior to being laminated to the web of woven fabric (the "woven web"), thereby to decrease the permeability of the resulting laminate to aerosols and dusts;

(8) The article (i.e., the laminate of this invention) is submitted to compressive shrinkage after the adjunct layer is laminated, or bonded, to the substrate, thereby to decrease the permeability of said laminate to aerosols and dusts;

(9) This invention is also directed to an article of manufacture comprising a self-supporting, flexible, breathable, wearable, protective nonwoven fabric, said fabric being substantially nonpermeable to aerosols and dusts; said fabric comprising a mixture of a first stable fiber and a second staple fiber, said fibers being bonded together, said mixture consisting essentially of; (a) about 30–90 parts of the first staple fiber, said first staple fiber consisting essentially of at least one substantially linear thermoplastic polymer having a commercial moisture regain value of less than about 5% and having a diameter of about 17–50 microns; and (b) about 10–70 parts of the second staple fiber, said second staple fiber consisting essentially of fiber having a commercial moisture regain value of about 5–15% and having a diameter of about 1–16 microns;

(10) The article comprising the nonwoven fabric is prepared from a first staple fiber having a diameter of about 17–23 microns and a second staple fiber having a diameter of about 5–16 microns;

(11) The fibers of the article comprising the nonwoven fabric are bonded together with a flexible, breathable matrix of at least one flexible film-forming polymer, the fiber:polymer weight ratio being about 30:1 to 4:1 based on the dry weight of both fiber and polymer;

(12) The fibers of the article comprising the nonwoven fabric are heat-bonded together;

(13) The article comprising the nonwoven fabric is made from a first staple fiber and a second staple fiber, the first staple fiber having a commercial moisture regain value of less than about 1%; and (14) The article (i.e., the nonwoven fabric) of this invention is submitted to compressive shrinkage, thereby to decrease the permeability of said article to aerosols and dusts.

We prepare a nonwoven fabric by mixing, or blending, a first staple fiber and a second staple fiber, thereby to form a mixture, or blend, of said first staple fiber and said second staple fiber, the first staple fiber and the second staple fiber being distributed substantially evenly throughout said blend, or mixture. Similarly, we can prepare a nonwoven fabric from a blend of a third staple fiber and a fourth staple fiber.

We prefer to blend a first staple fiber and a second staple fiber (or a third staple fiber and a fourth staple fiber) in a predetermined weight ratio (about 30–90 parts of the first (or third) staple fiber and up to about 70 parts of the second (or fourth) staple fiber). The first staple fiber and the third staple fiber have commercial moisture regain values of less than about 5%, preferably less than about 1%, and a particle diameter of about 17–50 microns, preferably about 17–23 microns. The second staple fiber and the fourth staple fiber have commercial moisture regain values of 5–15% and a particle diameter of about 1–16 microns.

The first and third staple fibers can be identical or they can be different; however, each must consist essentially of at least one substantially linear thermoplastic polymer having a commercial moisture regain value of less than about 5% and each must have a diameter of about 17–50 microns. The second and fourth staple fibers can be identical or they can be different; however, each must consist essentially of at least one fiber having a commercial moisture regain value of about 5–15% and a diameter of about 1–16 microns.

The method used to blend, or mix the first and second staple fibers (or the third and fourth staple fibers) which we use to prepare nonwoven webs are not critical, and any practical procedure known in the art can be used. One method comprises preparing a plurality of first rough card webs from one fiber and a plurality of second rough card webs from another fiber. The first and second rough card webs can be combined in any desired ratio, picked or pulled apart in pickers or similar apparatus, mixed and recarded to form blended, or mixed, fiber card webs. An alternative method, which can also be used with excellent results, comprises placing the first rough card webs on top of the second rough card webs (or vice versa) in such quantity as to give a desired ratio of one fiber to the other; the rough card webs are then combined by needle-looming or by bonding or by both needle-looming and bonding. The bonding can be done by; (a) heat-bonding; or (b) bonding with a binder. Excellent results have been obtained with fibers that were carded into a card web and bonded (by heat-bonding or by bonding with a binder) without needle-looming. Other methods of blending, or mixing, different fibers will be readily apparent to those skilled in the art.

Where using heat-bonding, the web is heated to a temperature which will incipiently fuse the surfaces of the fibers comprising said web but which will *not* melt the fibers while applying pressure to said web. We have obtained excellent results with temperatures ranging from about 280–370° F., preferably about 310–340° F., and pressures of about 0.1–15 p.s.i.g. with heating times of about 3–15 minutes, preferably about 5–10 minutes. Various devices including heated metal plates, platen presses, and hot calenders have been used, with excellent results, to heat-bond webs (including needle-loomed and non-needle-loomed webs). The thus bonded web is cooled to ambient temperature (e.g., ca. 20–35° C.) to form a nonwoven fabric excellently adapted for making the laminates of this invention.

Where using heat-bonding to bond or laminate an adjunct layer to at least one surface of the aforesaid substrate, the fabric which will be the adjunct layer can be placed in surface-to-surface contact with at least one surface of the substrate prior to heat-bonding the fibers of the carded web of nonwoven fibers. The resulting system (i.e., a carded web of nonwoven fibers in surface-to-surface contact with a web of woven fabric) is heated to about 280–370° F., preferably about 310–340° F., under a pressure of about 0.1–15 p.s.i.g. for about 3.15 minutes, preferably about 5–10 minutes. Excellent results have been obtained with various devices including heated metal plates, platen presses, and hot calenders. Alternatively, the fibers of the web of carded fibers can be bonded to form a nonwoven fabric (which can be subjected to compressive shrinkage, as described infra) and at least one surface of the thus formed heat-bonded nonwoven fabric is placed in surface-to-surface contact with a web of woven fabric and the resulting system (i.e., a web of nonwoven fabric with its fibers heat-bonded together in surface-to-surface contact with a web of woven fabric) is heated to about 280–370° F., preferably about 310–340° F., under a pressure of about 0.1–15 p.s.i.g. for about 3–15 minutes, preferably about 5–10 minutes. Excellent results have been obtained with various devices including heated metal plates, platen presses, and hot calenders.

In certain embodiments of this invention, where using heat-bonding to bond a web of nonwoven fabric to the web of woven fabric, we apply a thin layer, or coating, or a thin web, or film, of a thermoplastic polymer having a low (e.g., ca. 220–320° F.) melting or softening point to the surface of the web of nonwoven fabric (or to the surface of the web of woven fabric) before bringing the web of woven fabric into surface-to-surface contact with the aforesaid web of nonwoven fabric, which can be a needle-loomed nonwoven fabric, with the aforesaid thin layer, or coating, or thin web, or film, of thermoplastic polymer between the two fabric webs. After bringing the aforesaid webs of nonwoven and woven fabric into such contact the resulting system is heated, while applying a pressure of at least about 0.1 p.s.i.g. and not more than about 10–30 p.s.i.g. thereto and using one of the general methods mentioned supra, thereby to form one of the laminates of this invention. Where using such techniques, the thermoplastic polymer can be applied as a thin layer, or coating, or thin web, or film; it can also be applied as a thin layer of pulverulent thermoplastic polymer or as a solution, dispersion, or the like of the thermoplastic polymer. Said thermoplastic polymer can be substantially any polymer melting or softening in the desired range (e.g., ca. 220–320° F.). A copolymer of vinyl chloride and vinyl acetate has given excellent results. The thin web or film of such thermoplastic polymer can be a thin sheet, a thin layer of foamed thermoplastic polymer, or a thin layer of woven or nonwoven fabric made of said thermoplastic polymer. Various other variations and modifications of this procedure will, on the basis of our disclosure, be readily apparent to those skilled in the art.

Where using a binder to bond the fibers of a web together, thereby to form a nonwoven fabric suitable for use in making the laminates of this invention, said bonding is accomplished by coating or impregnating a carded web of nonwoven fibers (which can be needle-loomed after carding) with a binder, said binder being a polymer diluent system selected from the group consisting of solutions and dispersions of film-forming polymers in inert diluents, said diluents can be solvents in which the film-forming polymers are soluble or media in which such polymers are dispersed.

Polymer-diluent systems well adapted for use as binders in the process of this invention include solutions of flexible film-forming polymers in solvents and dispersions of flexible film-forming polymers in media. Such dispersions include suspensions, emulsions, and latexes. The term diluent, as stated supra, includes both solvents in which the film-forming polymers are soluble and media in which such polymers can be dispersed to form dispersions, or suspensions, including latexes and emulsions. Diluents which we have found to be especially useful in the process of this invention include water, tetrahydrofuran, chloroform, carbon tetrachloride, ethylene dichloride, methanol, ethanol, isopropyl alcohol, acetone, toluene, xylene, acetonitrile, hexane, heptane, dimethyl formamide, dimethyl sulfoxide, and mixtures thereof. Other diluents which can be used with excellent results in the process of this invention will, on the basis of the disclosure herein presented, be readily apparent to those skilled in the art.

Flexible film-forming polymers with which we have obtained excellent results include homopolymers of vinyl chloride, copolymers of vinylidene chlorides with monomers selected from the group consisting of methyl acrylate, ethyl acrylate, acrylamide, and acrylonitrile, homopolymers of vinyl acetate and copolymers of vinyl acetate with monomers selected from the group consisting of methyl acrylate, ethyl acrylate, acrylamide, and acrylonitrile. We have also obtained excellent results using copolymers in which polyvinyl chloride was the principal constituent. Where using copolymers of vinylidene chloride, we prefer to use those in which polyvinylidene chloride constitutes the major component; however, we have obtained excellent results with copolymers of vinylidene chloride in which the vinylidene chloride is not the major component. Where using the copolymers of vinyl acetate, we prefer to use those in which polyvinyl acetate is the major component; however, we have obtained excellent results with such copolymers in which the polyvinyl acetate was not a major component. We have also obtained excellent results with copolymers of acrylic acid with acrylonitrile and the like. Other polymers which can be used with excellent results in the process of this invention, will, on the basis of the disclosure herein presented, be readily apparent to those skilled in the art. We have obtained excellent results where using binders consisting essentially of about 1–70 parts of polymer and about 30–99 parts of diluent; however, we generally prefer to use binders consisting essentially of about 15–25 parts of polymer and about 75–85 parts of diluent.

Where using dispersions of film-forming polymers (e.g., film-forming emulsions, film-forming suspensions, or film-forming latexes) in the process of this invention, we have obtained excellent results with dispersions in which the polymer particles had diameters ranging from about 100 A. to about 100,000 A.; however, we prefer to use polymer particles ranging in diameter from about 700 A. to about 4,000 A.

Where using a binder to bond, or laminate, a first web of woven fabric to a second web of nonwoven fabric which has been prepared by heat-bonding the fibers or a nonwoven carded web of fibers, we apply a coat, or coating, of a binder (as disclosed and described supra) to at least one surface of the first web (or to at least one surface of the second web or to surfaces of both the first and second webs) and bring the first and second webs into surface-to-surface contact prior to drying the coated surface and then drying the resulting system (i.e., the first and second webs which are in surface-to-surface contact with a binder-coated surface or at least one web being in surface-to-surface contact with a surface of the other web) and then drying said system while maintaining the system under a slight or moderate pressure (e.g., a pressure of about 0.02–2 p.s.i.g.), thereby to form a laminate of our invention.

By "drying" is meant evaporating "moisture" (i.e., a diluent as disclosed and described supra), which was added as a component of the binder, until the thus treated fabric is substantially free of such diluent. The drying temperature can be ambient temperature (e.g., ca. 20–35° C.) or an elevated temperature. However, the drying temperature must be such that neither the polymer (added as a component of the binder) nor the fabric will be melted, charred, burned, or otherwise damaged or decomposed by heat. Subsequent to drying, the thus dried items (substrates, laminates, or the like) are cooled to ambient temperature (e.g., ca. 20–35° C.).

Where using a binder to bond fibers to produce a nonwoven fabric, the laminate of our invention can be formed by applying a web of woven fabric to the "wet" (not dried) nonwoven fabric and then drying the resulting system, thereby to form the laminate of our invention. In another embodiment of this invention the wet (binder-treated) web comprising a first nonwoven fabric is dried (e.g., at ambient or elevated temperature substantially as described supra) and a coating of binder is applied to the thus dried first nonwoven fabric (the binder can also be applied to a web comprising a second woven fabric which will be bonded to the first nonwoven fabric or the binder can be applied to both the first and second fabrics). Subsequent to applying the binder, and prior to drying, a web comprising a second woven fabric is placed in surface-to-surface contact with the nonwoven fabric in such manner that a wet binder treated surface of one fabric (the first fabric or the second fabric) is brought into surface-to-surface contact with a surface of the other fabric. The resulting system (the first and second fabrics in surface-to-surface contact) is then dried as described supra under slight pressure (e.g., ca. 0.05–2 p.s.i.g.) to produce a laminate of this invention.

As noted supra, in one embodiment of this invention the binder-impregnated web of nonwoven fabric is dried, thereby to form a dry nonwoven fabric excellently adapted for use in making the laminates of this invention, prior to bringing the binder-impregnated web into surface-to-surface contact with a web of woven fabric. Where using this embodiment, the nonwoven fabric can be subjected to compressive shrinkage (as described infra) prior to laminating, or bonding, said fabric to at least one web of woven fabric.

As noted supra, in certain embodiments of our invention, the nonwoven fabric is subjected to compressive shrinkage (as set forth infra) prior to being bonded to a web of woven fabric. Laminates made from nonwoven fabrics which have been subjected to compressive shrinkage have lower permeabilities to aerosols and dusts than do substantially identical laminates made from nonwoven fabrics which have not been subjected to compressive shrinkage. Where using one of these embodiments with a nonwoven fabric having its fibers bonded together with a polymer which was applied as a binder, the nonwoven fabric is, as stated supra, dried prior to being subjected to compressive shrinkage.

In certain embodiments of our invention, the finished laminate is subjected to compressive shrinkage. We have found that compressive shrinkage of a laminate made by the process of our invention will substantially decrease the permeability of said laminate to aerosols and dusts (including toxic aerosols and dusts).

We have found that a laminate made by the process of our invention but using a nonwoven fabric which has been subjected to compressive shrinkage as substrate or as an adjunct layer will have a substantially lower permeability to aerosols and dusts (including toxic aerosols and dusts) than a laminate made by the same procedure and from the same materials (including substrate, binder, and adjunct layer, or layers) but *without* subjecting the substrate to compressive shrinkage.

We have found that; (a) the nonwoven fabrics used to prepare the laminates of our invention; and (b) the laminates of our invention can be compressively shrunk by the process described by C.A. Shoudy, TAPPI, volume 42, No. 1, Jan. 1959, pages 108A–110A, and we prefer to use this process where subjecting the laminates of our invention, or the nonwoven fabrics which we use in the preparation of such laminates, to compressive shrinkage. Shoudy's article is directed to the compressive shrinkage of paper, but we have found that the laminates of our invention or the nonwoven fabrics which we use in the preparation of our laminates can be substituted for the paper taught by Shoudy.

We have found that the laminates of our invention are excellently adapted for use as protective clothing for protecting personnel against toxic and corrosive aerosols and dusts such as those of arsenic, beryllium, mercury, sulfuric acid, phosphoric anhydride, toxic chemical agents (e.g., nerve gases, and the like), toxic herbicides, toxic insecticides such as parathion, sodium fluoride, tetraethyl pyrophosphate, and the like. We have found that clothing made from the laminates of our invention have protected those wearing such clothing from toxic dusts, aerosols, and the like having particle sizes ranging in diameter from about 0.01 micron up to about 1 mm. or larger.

Our invention will be further illustrated by the following examples which are illustrative only and which are not intended to limit the scope of the invention.

EXAMPLE I

A blend of staple fibers was prepared by mixing about 80 parts of polypropylene staple fiber having a diameter of about 17 microns and about 20 parts of viscose staple fiber having a diameter of about 22 microns. The resulting blend of staple fibers was carried into a card web which was then passed through a needle-punch machine to produce a needle-loomed web. The thus prepared needle-loomed web was impregnated with a binder (an aqueous suspension of a copolymer of vinylidene chloride and vinyl chloride having a solids content of about 30%), said binder being applied at such rate as to yield a substrate having a fiber:film-forming polymer weight ratio of about 15:1 (dry basis). Before drying the binder-treated needle-loomed web of nonwoven fabric, a web of woven cotton fabric having a thickness of about 1/64 inch was applied to each surface of said binder-treated nonwoven fabric; the resulting system was dried at about 210–220° F., while under a pressure of about 0.5 p.s.i.g., thereby to form a laminate ("Laminate No. I") comprising a substrate of nonwoven fabric, said fibers being bonded together with a film of film-forming polymer, a film of film-forming polymer bonding a web of woven cotton cloth to the surface of the substrate, said laminate being a self-supporting, flexible, breathable, wearable laminate substantially nonpermeable to aerosols and dusts and excellently adapted for use in making protective clothing (i.e., as a "fabric" from which such clothing is made).

Laminate No. I was tested for permeability to aerosols and dusts by a methylene blue penetration test. Said test used the general procedure of British Standard No. 2577: 1955, as reported in the Second Edition of H. L. Green and W. R. Lane, "Particles Clouds: Dusts, Smoke and Mists," D. Van Nostrand Company, Inc., Princeton, N.J., but modified by using a sidestream of methylene blue-air mixture flowing at the rate of 1 liter per minute passing through a circular sheet of said laminate, said sheet having a radius of about 5.65 centimeters, said sheet being positioned substantially perpendicular to the direction of flow of the methylene blue-air stream. The methylene blue penetration was 11%.

EXAMPLE II

The general procedure of Example I was repeated. However, in this instance the procedure was modified by applying a web of the above-described woven cotton fabric to only one surface of the wet binder-treated web of needle-loomed nonwoven fabric.

The resulting laminate, which was excellently adapted to the production of protective clothing, was designed "Laminate No. II."

The methylene blue penetration of said laminate was 12%.

EXAMPLE III

A sheet of Laminate No. I was subjected to compressive shrinkage using the apparatus and general procedure taught by Shoudy (TAPPI, volume 42, No. 1, January 1959, pp. 108A–110A) but modified by substituting the laminate of this invention for the paper of Shoudy.

The methylene blue penetration of the thus treated laminate was 7%.

EXAMPLE IV

The general procedure of Example I was repeated; however, in this instance the fibers of the needle-loomed web of nonwoven fabric were heat-bonded together. This was accomplished by pressing a sheet of the needle-loomed web of nonwoven fabric (prior to treating said fabric with binder) in a platen press at about 15 p.s.i.g. at about 315–320° F. for about 8 minutes, removing the thus heated fabric from the press, and cooling the fabric, thereby to obtain a nonwoven fabric excellently adapted for use in preparing the laminates of our invention. The thus formed nonwoven fabric was coated (on both surfaces) with the aforesaid latex of vinylidene chloride-vinyl chloride copolymer, at a rate such that the weight ratio of fabric:film-forming polymer was about 20:1 (dry basis), and a web of the same woven cotton fabric used in Example I was applied to each surface of the binder-treated substrate. The resulting system was dried at about 110° C., while under a pressure of about 0.7 p.s.i.g., to form a laminate (which was designated "Laminate No. IV") which was excellently adapted for making protective clothing.

Laminate No. IV was found to have a methylene blue penetration of about 11.5%.

EXAMPLE V

Laminate No. IV was subjected to compressive shrinkage according to the general procedure of Example III. The thus treated laminate was excellently adapted for use in making protective clothing.

The methylene blue penetration of the thus treated laminate was 7%.

EXAMPLE VI

The general procedure of Example I was repeated but modified by using a binder comprising a solution of a copolymer of vinylidene chloride and ethylacrylate in a diluent (solvent) consisting essentially of tetrahydrofuran. Said binder was applied to the needle-loomed web of nonwoven fabric at such rate as to result in a substrate having a fabric:film-forming polymer weight ratio (dry basis) of about 10:1. The diluent:polymer weight ratio of the binder was about 3:1.

The resulting laminate having a methylene blue penetration value of 10% was excellently adapted for making protective clothing.

EXAMPLE VII

The general procedure of Example IV was repeated; however, in this instance the web of woven fabric was heat-bonded to the needle-loomed web of nonwoven fabric. This was accomplished by placing a web of the same woven cotton fabric used in Example IV in surface-to-surface contact with each surface of the web of needle-loomed fabric. without the addition of any binder, and pressing the resulting system in a platen press at about 13 p.s.i.g., at about 325–330° F. for about 10 minutes.

The resulting laminate, having a methylene blue penetration value of 11%, was excellently adapted for making protective clothing.

EXAMPLE VIII

The procedure of Example VII was repeated but the web of woven cotton fabric was replaced with a web of woven viscose rayon.

The resulting laminate, having a methylene blue penetration value of about 12%, was excellently adapted to making protective clothing.

EXAMPLE IX

A blend of staple fibers was prepared by mixing about 50 parts of polypropylene staple fiber having a diameter of about 17 microns with about 50 parts of viscose staple fiber having a diameter of about 7 microns. The resulting blend of staple fibers was carded into a card web which was then passed through a needle-punch machine 20 times to produce a needle-loomed web. The thus prepared needle-loomed web was impregnated with a latex (an aqueous dispersion of polymethyl acrylate), said latex having a solid content of about 30%, using sufficient latex to produce a nonwoven fabric having a fiber:polymer (i.e., polymethyl acrylate) weight ratio of about 18:1 (dry basis). The thus treated needle-loomed web was dried by heating to about 110–130° F. for about an hour, thereby to form a polymer-bonded nonwoven fabric having a thickness of about 0.06 inch. Said fabric was labeled "Fabric IX." Fabric IX was excellently adapted for use as a fabric for making protective clothing.

The methylene blue penetration of Fabric IX was 14%.

EXAMPLE X

A sheet of Fabric IX was subjected to compressive shrinkage using the general procedure of Example III but modified by replacing the laminate of Example III with Fabric IX. The thus shrunk fabric, having a thickness of about 0.035 inch, was labeled "Fabric X." Fabric X was excellently adapted for use as a fabric for making protective clothing.

The methylene blue penetration of Fabric X was 8%.

EXAMPLE XI

A blend of staple fibers was prepared by mixing about 42 parts of viscose staple fiber having a diameter of about 9 microns, about 8 parts of viscose staple fiber having a diameter of about 17 microns and about 50 parts of polypropylene staple fiber having a diameter of about 17 microns. The resulting blend of staple fibers was carded to form a card web which was then passed through a needle-punch machine 4 times to produce a needle-loomed web. The thus prepared needle-loomed web was heat-bonded, thereby to produce a heat-bonded nonwoven fabric, by heating said needle-loomed web at about 320° F. under a pressure of about 10 p.s.i.g. for about 10 minutes in a platen press. The thus formed fabric was removed from the press, cooled to about room temperature, and labeled "Fabric XI." Fabric XI which had a thickness of about 0.025 inch, was excellently adapted for use as a fabric for making protective clothing.

The methylene blue penetration of Fabric XI was about 13%.

EXAMPLE XII

A sheet of Fabric XI was subjected to compressive shrinkage using the general procedure of Example III but modified by replacing the laminate of Example III with Fabric XI. The thus shrunk fabric, having a thickness of about 0.02 inch was labeled "Fabric XII." Said fabric was excellently adapted for use as a fabric for making protective clothing.

The methylene blue penetration of Fabric XII was about 7%.

EXAMPLE XIII

A laminate was prepared according to the general procedure of Example I but modified by using Fabric X as substrate. The resulting laminate (Laminate XIII) was excellently adapted for use in making protective clothing.

The methylene blue penetration of Laminate XIII was 7%.

EXAMPLE XIV

The general procedure of Example I was repeated; however, in this instance two heat-bonded nonwoven webs was *not* passed through a needle-punch machine (i.e., the nonwoven fabric was *not* needle-loomed; said fabric was "nonneedle-loomed").

A laminate prepared from said nonneedle-loomed fabric by the general procedure of Example I had a methylene blue penetration of 12%. Said laminate was excellently adapted for use in making protective clothing.

EXAMPLE XV

The general procedure of Example IV was repeated; however, in this instance two heat-bonded nonwoven webs were used as adjunct layers and a web of woven fabric was used as substrate. This heat-bonding was accomplished by pressing a card of nonwoven fabric, which had *not* been treated with a binder, in a platen press at about 15 p.s.i.g. at about 315–320° F. for about 8 minutes, removing the thus formed heat-bonded nonwoven fabric from the press and cooling said fabric, thereby to obtain a nonwoven fabric excellently adapted for use in preparing the laminates of our invention. The thus formed nonwoven fabric was coated on one surface only with a latex of vinylidene chloride vinyl chloride copolymer having a solid content of about 30%, at a rate such that the weight ratio of fabric to film-forming polymer was about 15 to 1 (dry basis); one layer of this nonwoven fabric was placed on each of the two surfaces of a web of the same woven cotton fabric used in Example I. The resulting system was dried at about 220° F. while under a pressure of about 0.5 p.s.i.g. to form a laminate (designated "Laminate No. XV") which was excellently adapted for making protective clothing.

Laminate No. XV was found to have a methylene blue penetration of about 8%.

EXAMPLE XVI

The general procedure of Example XV was repeated; however, in this instance, the two layers of heat-bonded nonwoven web were heat-bonded to the two surfaces of a web of woven fabric without the use of any binder. This was accomplished by placing a web of the same woven cotton fabric used in Example IV in surface-to-surface contact with two webs of needle-loomed fabric (i.e., forming a "sandwich" containing a woven web in the center and a nonwoven web on each surface of the woven web) without the addition of a binder, and pressing the resulting system in a platen press at about 15 p.s.i.g. and at about 325–330° F. for about 15 minutes.

The resulting laminate, having a methylene blue penetration value of 7.7%, was excellently adapted for making protective clothing.

EXAMPLE XVII

A blend of staple fibers was prepared by mixing about 80 parts of polypropylene staple fiber having a diameter of about 17 microns and about 20 parts of viscose staple fiber having a diameter of about 22 microns. The resulting blend of staple fibers was carded into a card web which was then passed through a needle-punch machine to produce a needle-loomed web. The thus prepared needle-loomed web was impregnated with a binder (an aqueous suspension of a copolymer of vinylidene chloride and vinyl chloride having a solid content of about 25%), said binder being applied at such rate as to give a fiber:film-forming polymer weight ratio of about 20:1 (dry basis).

Figure 1:
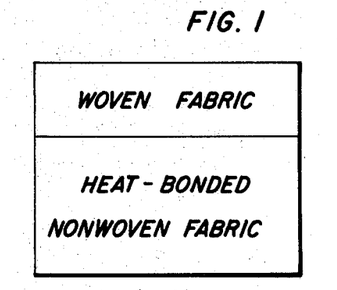
FIGS. 1–6 and 9–12, are schematic diagrams, or representations, of the laminates of this invention.
Figure 2:
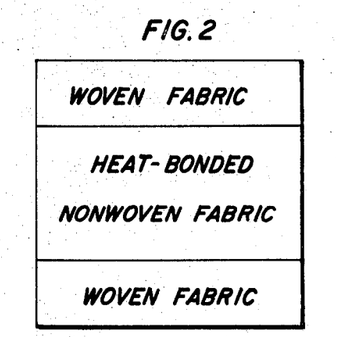
Figure 3:
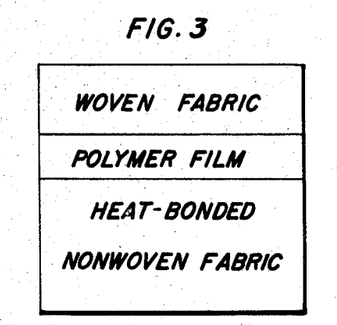
Figure 4:
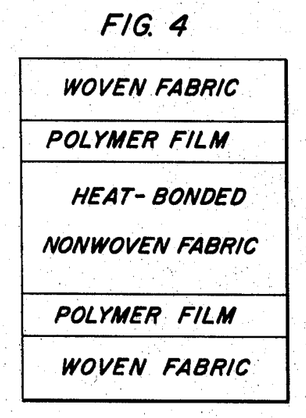
Figure 5:
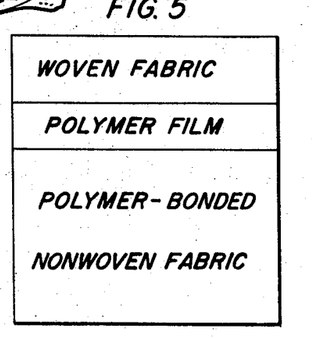
Figure 6:
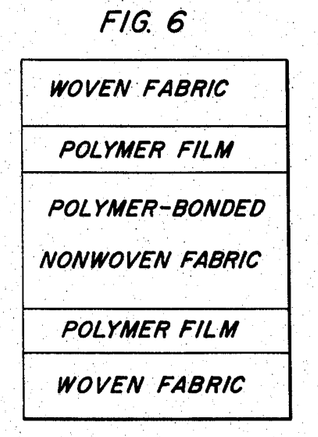
Figure 7:
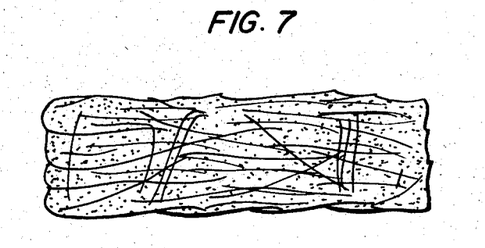
FIG. 7 represents a nonwoven fabric of our invention in which the fibers comprising the fabric are heat-bonded together.
Figure 8:
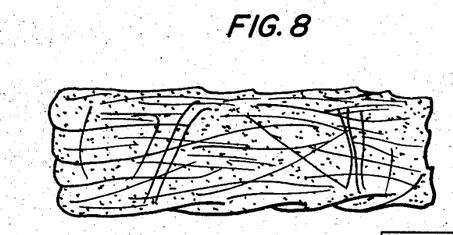
FIGS. 8 and 13 represent nonwoven fabrics of our invention in which the fibers are bonded together with a flexible, breathable matrix, or film, or coat, of film-forming polymer which coats, or covers, said fibers and bonds the fibers together.
Figure 9:
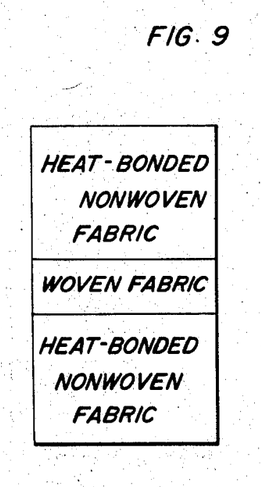
Figure 10:
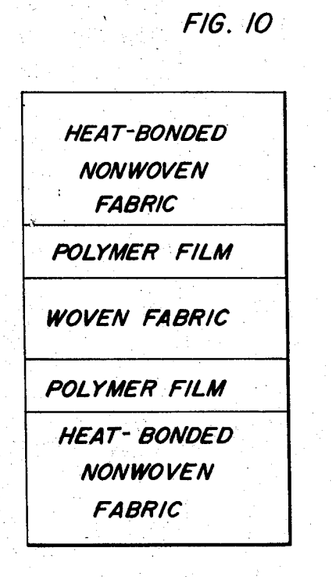
Figure 11:
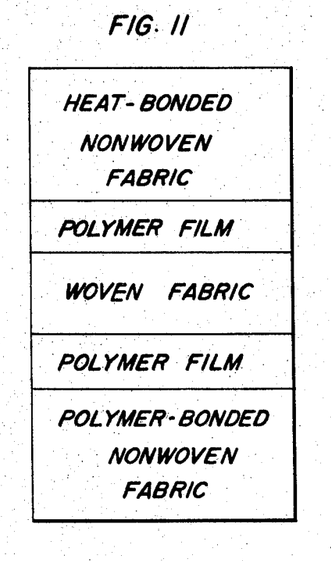
Figure 12:
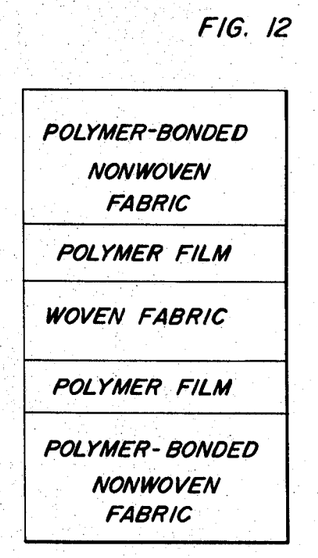
Figure 13:
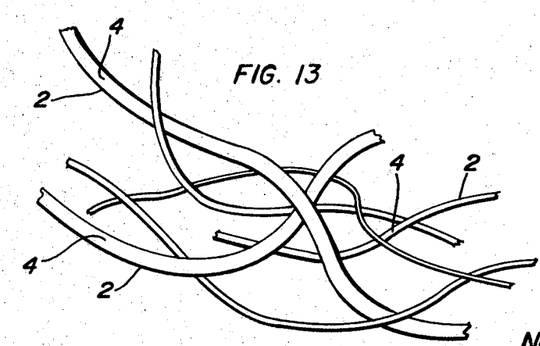

Before drying the thus formed web of binder-impregnated nonwoven fabric, a web of woven cotton fabric (from the same lot used in Example I) was placed in surface-to-surface contact with one surface of the aforesaid binder-impregnated nonwoven fabric. One surface of a heat-bonded nonwoven fabric prepared according to the general procedure of Example IV was coated with the aforesaid binder; the thus treated surface was placed in surface-to-surface contact with the remaining surface of the aforesaid web of woven fabric. The resulting system (a "sandwich" comprising the aforesaid web of woven fabric between the aforesaid web of binder-impregnated nonwoven fabric and the aforesaid web of binder-coated heat-bonded nonwoven fabric) was dried at about 240–260° F. while under a pressure of about 1.5–2 p.s.i.g., thereby to produce a laminate of the type represented by the schematic diagram of FIG. 11.

The methylene blue penetration of this laminate was about 6.5%. Said laminate was excellently adapted for making protective clothing.

EXAMPLE XVIII

A blend of staple fibers was prepared by mixing about 80 parts of polypropylene staple fiber having a diameter of about 17 microns and about 20 parts of viscose staple fiber having a diameter of about 22 microns. The resulting blend of staple fibers was carded into a card web which was then passed through a needle-punch machine to produce a needle-loomed web. The thus prepared needle-loomed web was impregnated with a binder (an aqueous suspension of a copolymer of vinylidene chloride and vinyl chloride having a solid content of about 30%), said binder being applied at such rate as to give a binder-impregnated web of nonwoven fabric having a fiber:film-forming polymer weight ratio of about 15:1 (dry basis). A web of woven cotton fabric having $\frac{1}{64}$ inch thickness was then placed between two essentially identical layers of the above-described binder-impregnated web of nonwoven fabric (before drying the binder-impregnated fabric). The resulting system was dried at about 220–230° F., while under a pressure of about 1.5 p.s.i.g., thereby to form a laminate comprising a substrate of woven fabric between two adjunct layers of nonwoven fabric. The fibers of the nonwoven fabric were bonded together with a film of film-forming polymer, and films of film-forming polymer bonded the substrate comprising a web of woven cotton cloth to the aforesaid adjunct layers. Said laminate was a self-supporting, flexible, breathable, wearable laminate substantially nonpermeable to aerosols and dust and excellently adaptable for use in making protective clothing (i.e., as a "fabric" from which such clothing is made).

The methylene blue penetration of this laminate was 8.5%.

As a result of our above description of processes for making the articles (laminates and nonwoven fabrics) of this invention, it will be readily apparent to those skilled in the art that said articles can be made by various modifications, adaptations, or variations of said processes.

The term "breathable" as applied to the laminates of this invention and to the components of said laminates including films, webs, and the like, to the nonwoven fabrics of this invention means that such laminates, components, and fabrics are permeable to air, carbon dioxide, and water vapor, thereby to permit the evaporation of moisture (e.g., perspiration) from the body of an individual clothed in protective clothing made from said laminates or said fabrics—especially where worn in hot and humid areas, thereby to make such clothing reasonably comfortable even in hot and humid areas.

The term "wearable" as applied to the laminates (and to the components thereof, i.e., films, webs, and the like) and nonwoven fabrics of this invention means that an individual can wear protective clothing made of said laminates or said fabrics in reasonable comfort for prolonged periods (e.g., up to 15–20 hours or longer) even in hot and humid areas without suffering undue discomfort and without any serious ill effect.

The term "substantially nonpermeable to aerosols and dusts" as applied to the laminates and nonwoven fabrics of this invention means that the methylene blue aerosol penetration of said laminates and said fabrics is less than about 15–20%; said penetration being determined by the general procedure of British Standard No. 2577: 1955, as reported in the second edition of H. L. Green and W. R. Lane, "Particles Clouds: Dusts, Smoke and Mists," D. Van Nostrand Company, Inc., Princeton, N.J., but modified by using a sidestream of methylene blue-air mixture flowing at the rate of 1 liter per minute passing through a circular sheet of said laminate, said sheet having a radius of about 5.65 centimeters, said sheet being positioned substantially perpendicular to the direction of flow of the methylene blue-air stream.

The term "protective" as applied to the articles (laminates and nonwoven fabrics) of this invention means that clothing made from said articles will protect those wearing such clothing from toxic aerosols and toxic dusts.

The terms "moisture regain" and "commercial moisture regain" as used herein mean commercial moisture regain as defined or set forth in ASTM designation D1909–61T.

The term "percent" (%) as used herein means percent (i.e., parts per hundred) by weight unless otherwise defined or qualified where used.

The term "p.s.i.g." as used herein means pounds per square inch gauge pressure.

The term "parts" as used herein means parts by weight unless otherwise defined where used.

As a result of the disclosure made in this specification, it will be readily apparent to those skilled in the art that the exact times, temperatures, and pressures used to heat-bond fibers of the nonwoven fabrics of this invention and to heat-bond nonwoven fabrics to woven fabrics to make the laminates of this invention will depend upon the type of thermoplastic polymers present as fibers and binders (where a binder is present) and the type of apparatus used.

The term "A." as used herein means angstrom unit or angstrom units.

What is claimed is:

1. An article of manufacture comprising a self-supporting, flexible, breathable, wearable, protective laminate; said laminate being substantially nonpermeable to aerosols and dusts; the total thickness of said laminate being about $\frac{1}{64}$ to $\frac{1}{8}$ inch; and said laminate comprising:
    (a) a substrate having two surfaces, said substrate comprising a flexible, wearable, breathable, nonwoven fabric made from a mixture of a first staple fiber and a second staple fiber, said fibers being bonded together, said mixture consisting essentially of about 30 to 90 parts of the first staple fiber, said first staple fiber consisting essentially of at least one substantially linear thermoplastic polymer having a commercial moisture regain value of less than about 5 percent and having a diameter of about 17 to 50 microns; about 10 to 70 parts of the second staple fiber consisting essentially of fiber having a commercial moisture regain value of about 5 to 15 percent and having a diameter of about 1 to 16 microns; and
    (b) an adjunct layer bonded to at least one of said surfaces of said substrate, said adjunct layer being a flexible, breathable, wearable fabric made of yarn.

2. The article of claim 1 in which the fibers of the nonwoven fabric are bonded together with a flexible, breathable matrix of at least one flexible film-forming polymer, the fiber:polymer weight ratio being about 30:1 to 4:1 based on the dry weight of both fiber and polymer.

3. The article of claim 1 in which the fibers of the nonwoven fabric are heat-bonded together.

4. The article of claim 3 in which the substrate and the adjunct layer are heat-bonded together.

5. The article of claim 1 in which the adjunct layer is bonded to the substrate by a breathable film of film-forming polymer, the substrate:polymer weight ratio being about 300:1 to 5:1 based on the dry weight of both substrate and polymer.

6. The article of claim 1 in which the nonwoven fabric is subjected to compressive shrinkage prior to being laminated to the adjunct layer.

7. The article of claim 1 in which said article is subjected to compressive shrinkage.

8. An article of manufacture comprising a self-supporting, flexible, breathable, wearable, protective nonwoven fabric, said fabric being substantially nonpermeable to aerosols and dusts; said fabric comprising a mixture of a first staple fiber and a second staple fiber, said fibers being bonded together, said mixture consisting essentially of:
   (a) about 30–90 parts of the first staple fiber, said first staple fiber consisting essentially of at least one substantially linear thermoplastic polymer having a commercial moisture regain value of less than about 5% and having a diameter of about 17–50 microns; and
   (b) about 10–70 parts of the second staple fiber, said second staple fiber consisting essentially of fiber having a commercial moisture regain value of about 5–15% and having a diameter of about 1–16 microns.

9. The article of claim 8 in which the first staple fiber is fiber having a diameter of about 17–23 microns and the second staple fiber is fiber having a diameter of about 5–16 microns.

10. The article of claim 8 in which the fibers of the fabric are bonded together with a flexible, breathable matrix of at least one flexible film-forming polymer, the fiber:polymer weight ratio being about 30:1 to 4:1 based on the dry weight of both fiber and polymer.

11. The article of claim 8 in which the fibers of the fabric are heat-bonded together.

12. The article of claim 8 in which the commercial moisture regain value of the first staple fiber is less than about 1%.

13. The article of claim 8 in which said article is subjected to compressive shrinkage.

14. An article of manufacture comprising a self-supporting, flexible, breathable, wearable, protective laminate; said laminate being substantially nonpermeable to aerosols and dusts; the total thickness of said laminate being about 1/64 to 1/8 inch; and said laminate comprising:
   (a) a substrate having two surfaces, said substrate comprising a flexible, wearable, breathable, woven fabric made from yarn; and
   (b) an adjunct layer bonded to at least one of said surfaces of said substrate, said layer being a flexible, breathable, wearable nonwoven fabric made from a mixture of a first staple fiber and a second staple fiber, said fibers being bonded together, said mixture consisting essentially of about 30 to 90 parts of the first staple fiber, said first staple fiber consisting essentially of at least one substantially linear thermoplastic polymer having a commercial moisture regain value of less than about 5 percent and having a diameter of about 17 to 50 microns; about 10 to 70 parts of the second staple fiber, said second staple fiber consisting essentially of fiber having a commercial moisture regain value of about 5 to 15 percent and having a diameter of about 1 to 16 microns; the weight ratio of said nonwoven fabric to said woven fabric being between about 0.1:1 to 5:1.

15. The article of claim 14 in which the first staple fibers are fibers having a diameter of about 17 to 23 microns and the second staple fibers are fibers having a diameter of about 5 to 16 microns.

16. The article of claim 14 in which the fibers of the nonwoven fabric are bonded together with a flexible, breathable matrix of at least one flexible film-forming polymer, the fiber:polymer weight ratio being about 30:1 to 4:1 based on the dry weight of both fiber and polymer.

17. The article of claim 14 in which the fibers of the nonwoven fabric are heat-bonded together.

18. The article of claim 17 in which the substrate and the adjunct layer are heat-bonded together.

19. The article of claim 14 in which the adjunct layer is bonded to the substrate by a breathable film of film-forming polymer, the substrate:polymer weight ratio being about 300:1 to 5:1 based on the dry weight of both substrate and polymer.

20. The article of claim 14 in which the commercial moisture regain value of the first staple fibers is less than about 1 percent.

21. The article of claim 14 in which the nonwoven fabric is subjected to compressive shrinkage prior to being laminated to the adjunct layer.

22. The article of claim 14 in which said article is subjected to compressive shrinkage.

References Cited

UNITED STATES PATENTS

| | | | |
|---|---|---|---|
| 2,530,441 | 11/1950 | Reinhardt et al. | 161—81 |
| 2,988,469 | 6/1961 | Watson | 161—150X |
| 3,245,863 | 4/1966 | Sonnichsen | 161—72 |
| 3,276,944 | 10/1966 | Levy | 161—150 |
| 3,307,990 | 3/1967 | Homier et al. | 161—81X |
| 3,396,071 | 8/1968 | Couzens | 161—170X |

ROBERT F. BURNETT, Primary Examiner

R. L. MAY, Assistant Examiner

U.S. Cl. X.R.

161—150, 151, 98